(12) United States Patent
Woltring et al.

(10) Patent No.: US 8,639,869 B2
(45) Date of Patent: Jan. 28, 2014

(54) PORTABLE CONTROLLER FOR INTERFACING WITH PROCESS SYSTEM COMPONENTS

(75) Inventors: Kelvin Woltring, Gresham, OR (US);
Andreas Wilhelm, Schiltberg (DE);
Randy Willard Perry, Tigard, OR (US);
Terry Gene Sherbeck, Aloha, OR (US)

(73) Assignee: Schmitt Industries, Inc., Portland, OR (US)

( * ) Notice: Subject to any disclaimer, the term of this patent is extended or adjusted under 35 U.S.C. 154(b) by 0 days.

(21) Appl. No.: 13/616,738

(22) Filed: Sep. 14, 2012

(65) Prior Publication Data

US 2013/0073770 A1 Mar. 21, 2013

Related U.S. Application Data

(60) Provisional application No. 61/535,810, filed on Sep. 16, 2011.

(51) Int. Cl.
*G06F 13/00* (2006.01)
*B24B 49/00* (2012.01)
*G06F 1/16* (2006.01)

(52) U.S. Cl.
USPC ............ 710/303; 710/304; 451/5; 361/679.2; 361/697.3; 361/697.4

(58) Field of Classification Search
USPC ................................................ 710/300–304
See application file for complete search history.

(56) References Cited

U.S. PATENT DOCUMENTS

| | | | |
|---|---|---|---|
| 3,970,830 A | 7/1976 | White et al. | |
| 6,062,948 A * | 5/2000 | Schiff et al. | 451/9 |
| 6,115,247 A * | 9/2000 | Helot | 361/679.44 |
| 6,690,991 B1 * | 2/2004 | Kobayashi | 700/195 |
| 6,742,070 B2 * | 5/2004 | Fuchida | 710/303 |
| 6,976,900 B2 * | 12/2005 | Bolz | 451/5 |
| 7,090,654 B2 * | 8/2006 | Lotito et al. | 604/43 |
| 7,461,462 B2 * | 12/2008 | Bankestrom et al. | 33/550 |
| 7,529,080 B2 * | 5/2009 | Koutari | 361/679.3 |
| 7,930,957 B2 * | 4/2011 | Travez et al. | 82/118 |

(Continued)

FOREIGN PATENT DOCUMENTS

| | | |
|---|---|---|
| EP | 1043564 B1 | 2/2006 |
| KR | 20060103466 A | 9/2006 |
| KR | 20070036894 A | 4/2007 |

OTHER PUBLICATIONS

SBS Dynamic Balance System—Product Catalog; 56 pages, Dated Aug. 31, 2010.*

(Continued)

*Primary Examiner* — Brian Misiura
(74) *Attorney, Agent, or Firm* — John R. Thompson; Stoel Rives LLP (57) ABSTRACT

A portable control unit may be quickly coupled and decoupled from docking stations on a plurality of process system components, such as cylindrical grinding machines. The portable control unit may be used to control the process system component and receive and output data produced by the process system component. The ability to quickly couple and decouple the portable control unit may allow a single portable control unit to be used to control numerous process system components, thereby saving cost and space. Various communications interfaces and attachment mechanisms may be used to communicatively and mechanically couple the portable control unit to a docking station.

18 Claims, 7 Drawing Sheets

(56) References Cited

U.S. PATENT DOCUMENTS

2005/0197044 A1    9/2005    Bolz
2009/0276845 A1*  11/2009  Koara ............................ 726/16
2013/0081246 A1*  4/2013    Case et al. ................ 29/407.01

OTHER PUBLICATIONS

SBS Dynamic Balance System—"SBS Balance System Operation Manual with SB-5500 Seris Control"; Dated 2010, 51 pages.*
SBS Dynamic Balance System—"AE-1000 AE Monitor Operation Manual"; Dated Jan. 2011.*
SBS Dynamic Balance System—"Operations Manual—SB-4500 Series Control"; 51 pages, Dated 2007.*
SBS Dynamic Balance System Product Brochure; 6 pages, Dated 2012.*
International Search Report and Written Opinion for PCT/US2012/055313 filed Sep. 14, 2012, and mailed from International Searching Authority on Feb. 27, 2013, 9 pgs.

* cited by examiner

PORTABLE CONTROLLER FOR INTERFACING WITH PROCESS SYSTEM COMPONENTS

RELATED APPLICATIONS

This application claims priority to U.S. Provisional Patent Application Ser. No. 61/535,810 filed Sep. 16, 2011, which is hereby incorporated by reference herein in its entirety.

TECHNICAL FIELD

This disclosure relates generally to controllers for process system components and, more particularly, to a portable controller that can be moved and used interchangeably between one or more process system components.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

A shop floor and/or manufacturing line may include a plurality of process tools, machines, and/or components utilized in a product development and/or manufacturing process (collectively "process system components"). For example, a shop floor and/or manufacturing line may include one or more surface profilers designed to change the texture and/or microroughness of a workpiece (e.g., via etching, shaping, profiling, machining, forming, grinding, electroplating, coating, spraying, electroforming, etc.), surface roughness measurement or other workpiece measurement and characterization devices (e.g., optical surface roughness measurement devices), rotational balance measurement devices, and/or other manufacturing and measurement devices.

Process system components are often controlled by controller units or controllers that allow a user to interface with the components. For example, an integrated controller may be included in a process system component that allows a user to provide control instructions to the component through a user interface (e.g., via buttons, a keyboard, a touchscreen display, or the like). Further, an integrated controller may be capable of providing a user with measurement information, component status information, control feedback information, and the like from the process system component via any variety of user interfaces (e.g., a display, one or more LEDs, an audible speaker, and the like).

Integrated controllers for process system components are often relatively expensive parts and may account for a substantial amount of the total cost of a process system component. This additional cost may be multiplied on a shop floor and/or manufacturing line that includes several process system components. Moreover, as different process system components may have different integrated controllers and interfaces, users working on the shop floor and/or manufacturing line may be required to learn how to operate several different controller interfaces. Many times, the integrated/dedicated controller is used only from time to time and may sit idle without any adjustment needed from an operator. As a result, physical space and financial capital are consumed while the provided access is only minimally and/or occasionally required.

A portable control unit (also referred to as a portable controller) may be used to operate, control, receive status data from, and/or interface with one or more process system components (e.g., similar or different process system components). In some embodiments, the portable control unit may interface with a particular process system component via a dedicated docking station. For example, a shop floor and/or manufacturing line that includes multiple process system components may include multiple docking stations, which may be affixed to the corresponding process system components. Each of the multiple docking stations may be associated with one of the process system components and may be communicatively coupled with the process system components via a component interface. A power interface on the docking station may receive power from the process system component or another power source. The docking station may be integrated and/or mounted (e.g., via screws or bolts and holes) directly on a process system component or, alternatively, in a location nearby a process system component (e.g., on a nearby wall or the like).

A user may utilize the portable control unit with one or more process system components by moving the portable control unit between different docking stations. For example, a user may communicatively couple the portable control unit to a first docking station associated with a first process system component via their associated interfaces. Once a desired first operation (e.g., a measurement on a workpiece) utilizing the first process system component is complete, the user may decouple the portable control unit from the first docking station and move it to a second docking station associated with a second process system component to perform a desired second operation (e.g., balancing a grinding machine). In this manner, the portable control unit may be utilized to interface with one or more process system components on a shop floor and/or manufacturing line. Because the docking station is slimmer and inexpensive relative to the portable control unit, the portable control unit greatly reduces the overall cost and space requirements associated with each of the individual process system components and provides the user a common interface for multiple process system components. One portable control unit can support dozens or more docking stations for various process system components.

The portable control unit may include any number of input interfaces, such as buttons, switches, keyboards and/or keypads, scroll wheels/balls, touchpads, touchscreen displays, and the like, that may allow a user to provide input, commands, and/or control instructions for controlling a process system component to which the portable control unit is communicatively coupled. Further, the portable control unit may include any number of user output interfaces for providing a user with measurement information; measurement parameters; component status information, such as standby, measurement status, machine balancing data, and the like; control feedback information; and the like from a process system component via a display, one or more LEDs, an audible speaker, and any other human perceivable user interface. For example, a display may be configured to show numerical or graphical representations of measurement data, status data, and/or the like generated by a process system component.

The portable control unit may include a controller communications interface on a portion (e.g., a rear or side portion) of the portable control unit. The controller communications interface may be electrically and communicatively coupled to a mated docking station communications interface included on a corresponding portion of a docking station. Thereby, the portable control unit may be communicatively coupled to the docking station and the process system component. Electrical power may be provided to the portable control unit through the controller communications interface from the docking station communications interface. The portable control unit including the controller communications interface, the input interface, and the output interface may be configured to be substantially instantaneously operable when power is received. The portable control unit may have little or no boot sequence, which may allow the portable control unit to be substantially instantaneously operable. For example, the portable control unit may be operable in no more than 0.5, 1, 2, 5, or 10 seconds and/or the like.

The controller communications interface and the docking station communications interface may utilize any type of bi-directional communication interface and associated communication standard including, for example, IEEE 1284, RS232, USB, switches, power pads, connectors, and/or the like. In some embodiments, the controller communications interface and docking station communications interface may be directly, electrically couple with each other. For example, pins and/or electrical contacts with flat contact faces may physically contact a correspondingly mated interface. The interface may be selected to be rugged, to allow for quick changing, to be toolless, and to provide immediate positive connections so as to allow rapid movement of the portable control unit from docking station to docking station in a matter of seconds. In other embodiments, the portable control unit and docking station may communicate wirelessly, such as according to the near field communication standard, according to the blue tooth standard, according to the IEEE 802.11 standard, using infrared communications, and/or the like.

The portable control unit and/or docking station may include elements to protect the communications interfaces. For example, a support element, such as a rim, lip, or the like, may be on the rear portion of the portable control unit and may protrude beyond the controller communications interface. Thus, when the portable control unit sits on a surface with the controller communications interface facing downward, the portable control unit may rest on the support element, which may separate the controller communications interface from the surface. Similarly, a hinged cover plate may selectively cover the docking station communications interface to protect it. The hinged cover plate may include a metal, a polymer, and/or the like and may have foam on an inside face to further protect the docking station communications interface. The hinge may be located at the bottom of the docking station, so the cover plate opens downwards and gravity holds the cover plate in an open position. Mated securing mechanism, such as magnets, Velcro, or the like, may be located on the cover plate and docking station to secure the cover plate in a closed position. In some embodiments, the docking station communications interface may only operate when the cover plate is in the open position, which may be detected by trigger, such as a spring trigger and/or a trigger integrated into the securing mechanism. Alternatively or in addition, the trigger may be triggered by coupling of the portable control unit and may only power the docking station communications interface when the portable control unit is coupled to the docking station.

An attachment mechanism on the portable control unit may be configured to demountably couple to an attachment mechanism on the docking station. For example, the portable control unit may couple to the docking station without screws, nuts and bolts, and/or the like, which may require tools to decouple the portable control unit from the docking station. Instead, the portable control unit may be quickly, toollessly demounted by hand. In some embodiments, recesses on the portable control unit may be configured to receive lugs on the docking station. The lugs may be inserted into the recesses to removeably couple the portable control unit with the docking station, and the lugs may support the portable control unit. Multiple integrated mechanical guides included on the portable control unit and/or the docking station may function to aid in aligning the controller communications interface and the docking station communications interface during coupling and/or decoupling. The cover plate may cover the docking station attachment mechanism when the cover plate is in the closed position.

In an embodiment, a portable controller guide may mechanically interface with a docking station guide to create a hinge that when articulated, causes the controller communications interface and the docking station interface to align precisely and properly. In certain embodiments, the mechanical guides may be configured to allow the portable control unit to rotate relative to the docking station at the top to assist in mating of the two parts. Alternatively, the mechanical guides may be configured to allow the portable control unit to rotate relative to the docking station on one of its sides. Any other mechanical structure configured to align and firmly secure the controller communications interface and the docking station communications interface during coupling and/or decoupling may be utilized (e.g., fins, hinges, ribs, or the like). In addition, in certain embodiments, the portable control unit and/or the docking station may be configured to be selectively secured via any mechanical mechanism (e.g., snap fit, latches, screws, bolts, or the like) configured to secure the portable control unit relative to the docking station when the two are interfaced together.

Figure 1:
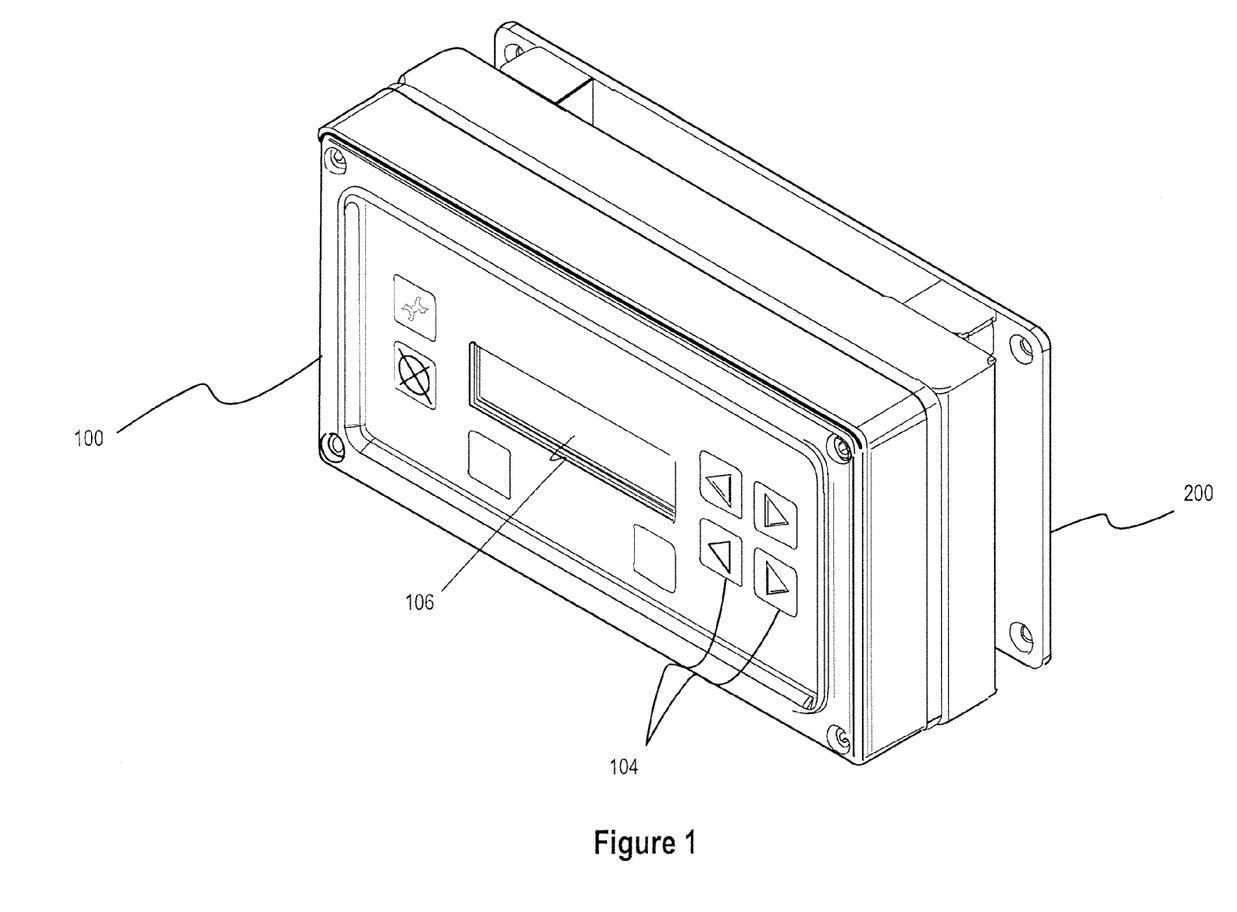
FIG. 1 is a front perspective view of a portable control unit removeably coupled with a docking station.

FIG. 1 is a front perspective view of a portable control unit 100 removeably coupled with a docking station 200. The docking station 200 may be associated with a particular process system component. The portable control unit 100 may include an input interface 104 and an output interface 106. Commands received by the input interface 104 may be transmitted to the docking station 200. Similarly, the output interface 106 may receive data from the docking station 200, which it then displays to a user.

Figure 2:
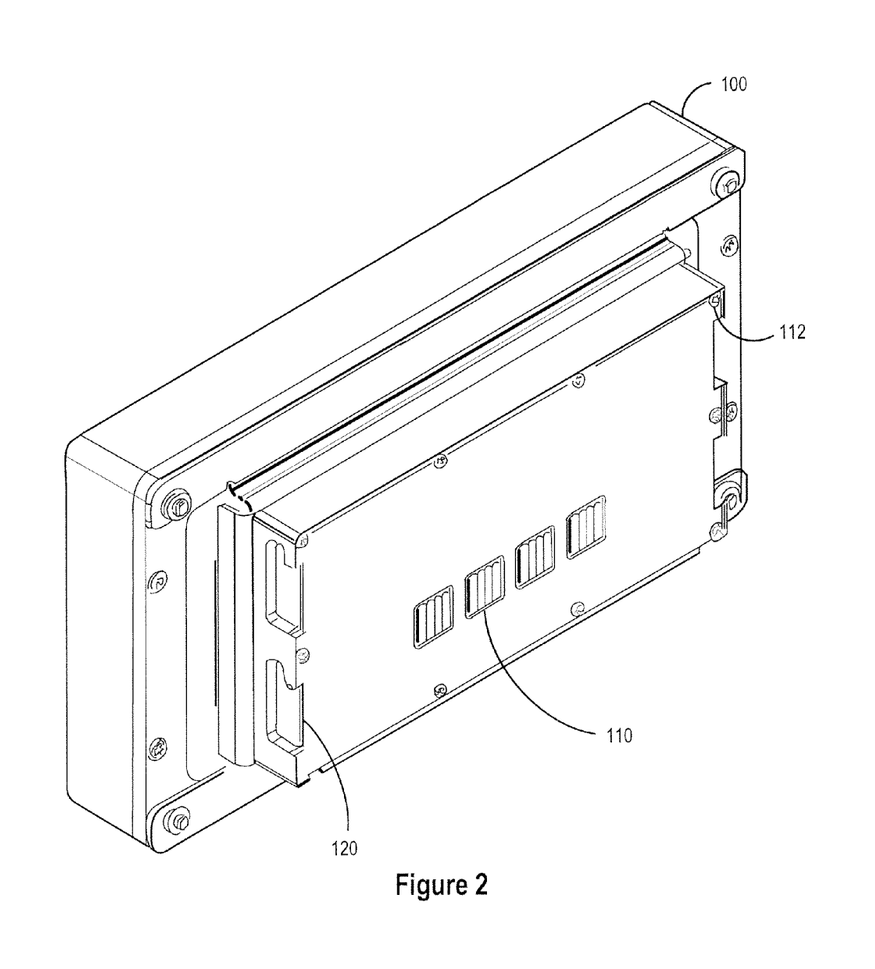
FIG. 2 is a rear perspective view of the portable control unit.

FIG. 2 is a rear perspective view of the portable control unit 100. The portable control unit 100 may include a controller communications interface 110. The controller communications interface 110 may include four sets of four electrical contacts. Each electrical contact may include a flat contact face. A rim 112 may surround the controller communications interface 110. The rim 112 may allow the portable control unit 100 to be rested on its back without having the controller communications interface 110 touch the surface on which the portable control unit 100 is being rested. The portable control unit 100 may also include a controller attachment mechanism 120, which may include one or more recesses. The recesses may turn upward at a right angle, so the portable control unit 100 must be lifted to be removed from the docking station 200.

Figure 3:
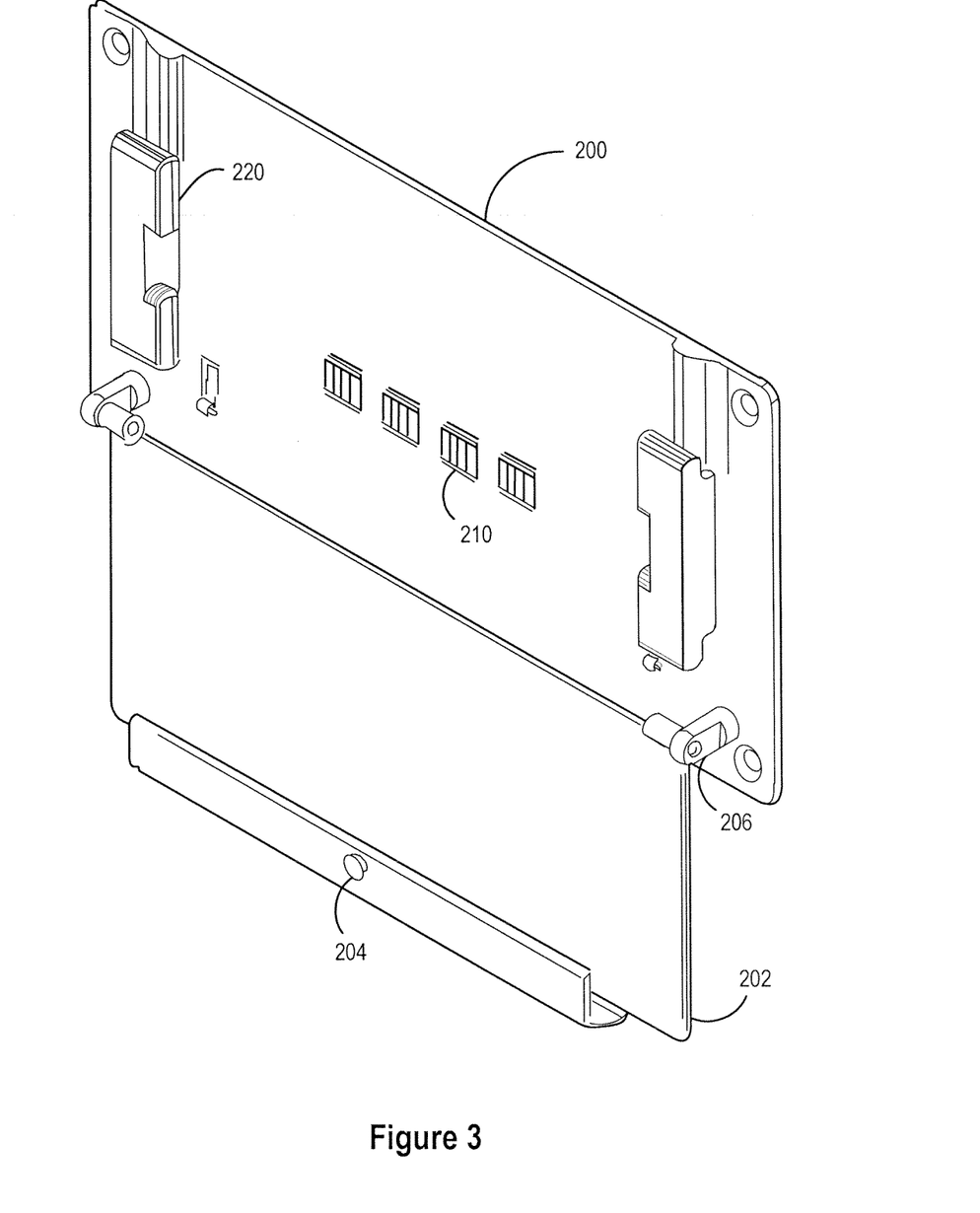
FIG. 3 is a front perspective view of the docking station.

FIG. 3 is a front perspective view of the docking station 200. The docking station 200 may include a docking station communications interface 210 configured to couple to the controller communications interface 110. Additionally, the docking station 200 may include a docking station attachment mechanism 220 configured to removeably couple with the controller attachment mechanism 120. The docking station attachment mechanism 220 may comprise one or more lugs configured to fit into the recesses of the controller attachment mechanism 120. The width of the docking station attachment mechanism 220 may be sized to provide for horizontal alignment of the portable control unit 100, and the lugs may provide for vertical alignment of the portable control unit. Further, the lugs and recesses may be configured to allow the portable control unit 100 to be rotated downward into a properly aligned position. A hinged cover plate 202 may be attached to the docking station 200 by hinges 206 located at the bottom of the docking station 200. A magnet 204 may hold the hinged cover plate 202 in a closed position to cover the docking station communications interface 210 and docking station attachment mechanism 220 when they are not in use.

Figure 4:
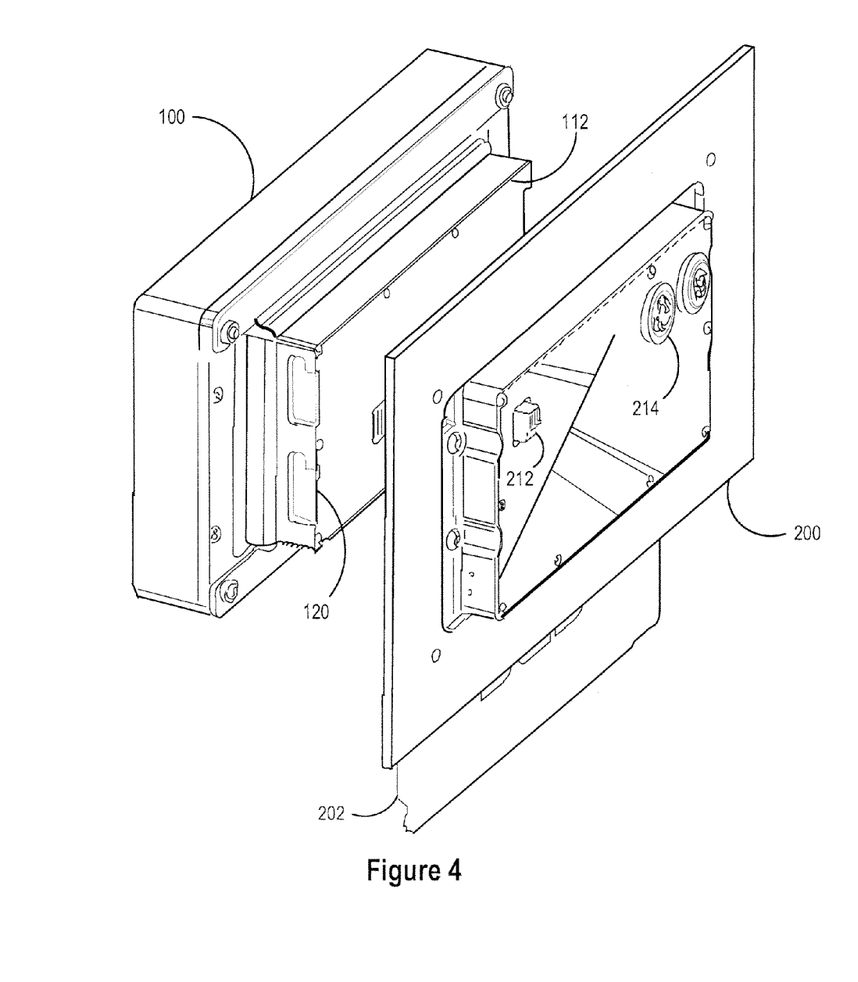
FIG. 4 is a rear perspective view of the docking station when it is about to be removeably coupled with the portable control unit.
Figure 5:
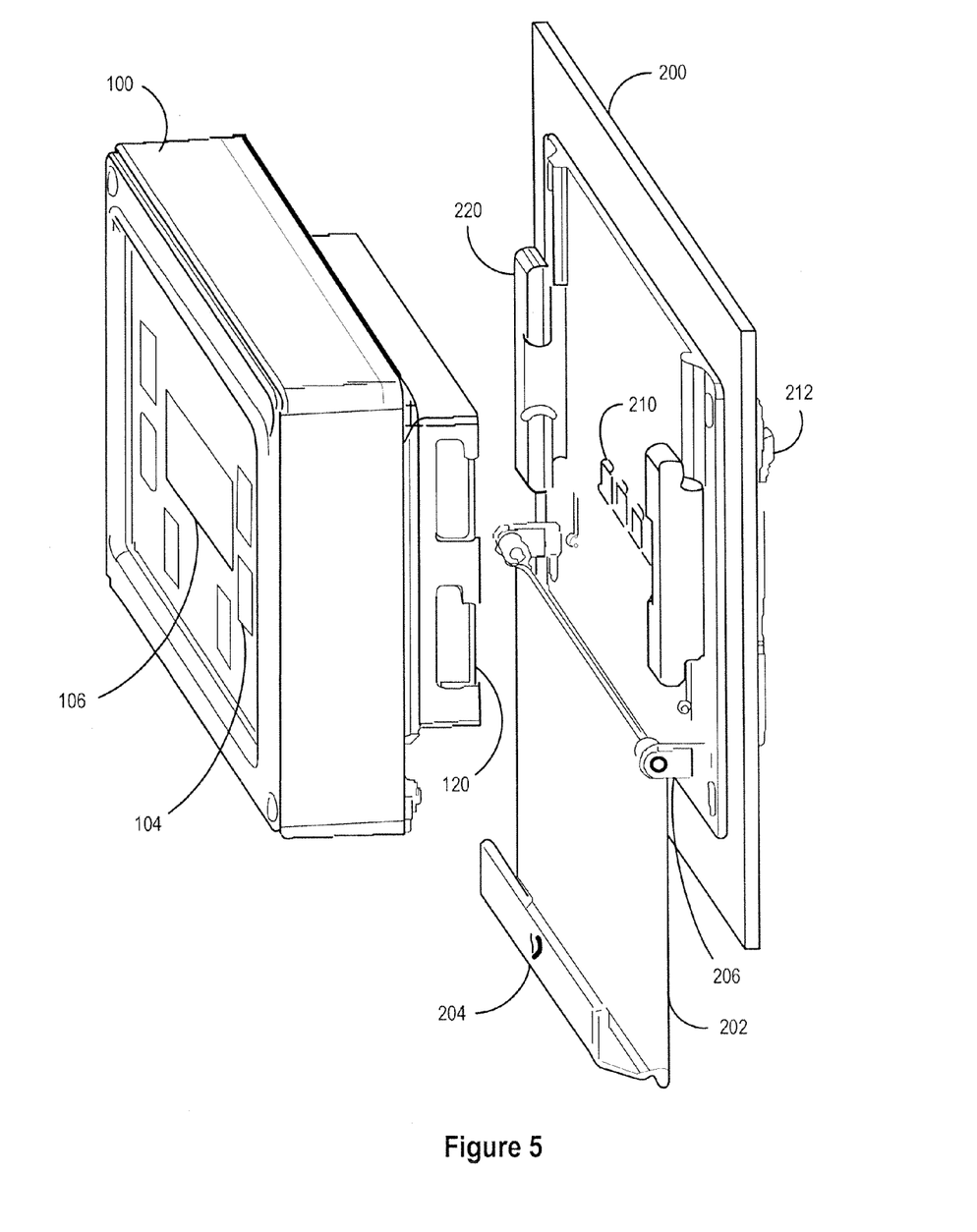
FIG. 5 is a side perspective view of the docking station when it is about to be removeably coupled with the portable control unit.

FIGS. 4 and 5 are rear and side perspective views of the docking station 200 when it is about to be removeably coupled with the portable control unit 100. A power interface 212 may be located on the rear of the docking station 200. A power line (not shown) from a process system component or another power source may be coupled to the power interface 212. A component interface 214 may be connected to a process system component by a communications line and may transmit input received from the portable control unit 100 to the process system component.

Figure 6:
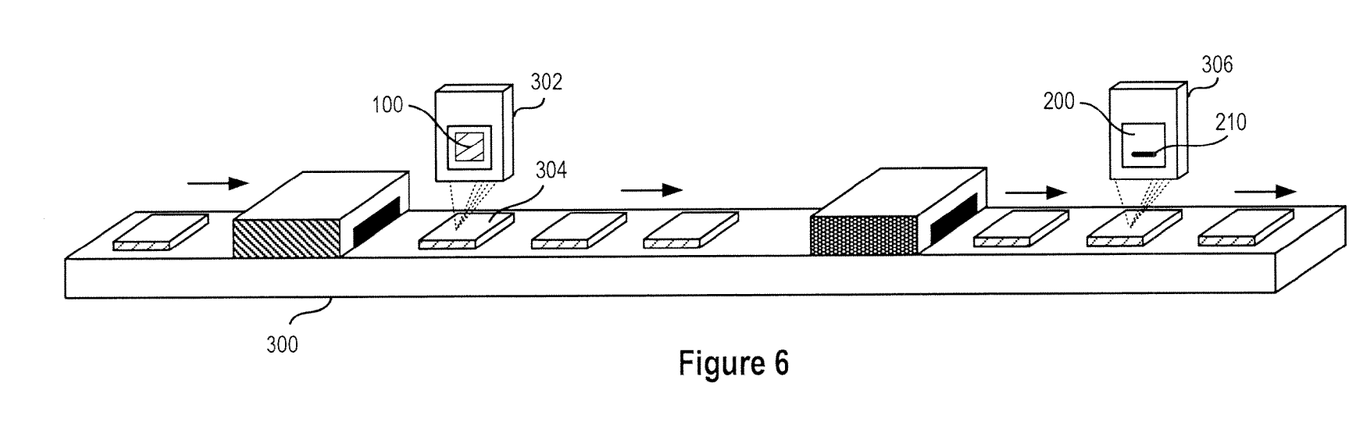
FIG. 6 is a front perspective view of an exemplary manufacturing line utilizing the portable control unit.

FIG. 6 is a front perspective view of an exemplary manufacturing line 300 utilizing the portable control unit 100. As shown, the manufacturing line 300 may include a plurality of process system components 302, 306 configured to operate on (e.g., measure) one or more workpieces 304 along the manufacturing line 300. Each of the process system components 302, 306 may include a docking station 200 configured to interface with a portable control unit 100. For example, as illustrated, a portable control unit 100 may be configured to interface with a docking station 200 associated with a first process system component 302, thereby allowing a user to operate and control the first process system component 302. If the user wishes to operate and control a second process system component 306, the user may decouple the portable control unit 100 from the docking station 200 associated with the first process system component 302 and couple it to a docking station 200 associated with the second process system component 306. In this manner, both the first process system component 302 and the second process system component 306 may be operated and controlled by the a single portable control unit 100.

Figure 7:
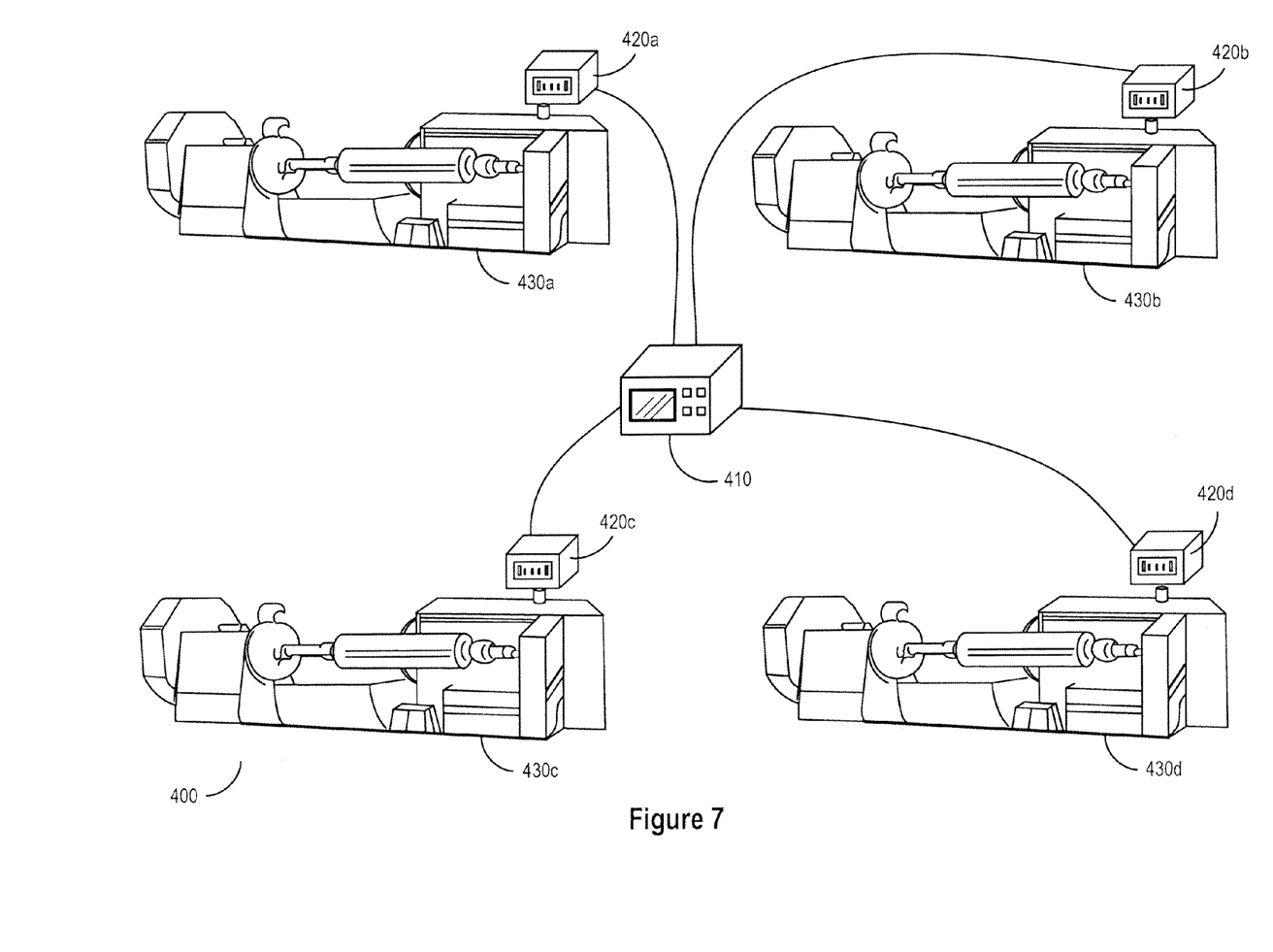
FIG. 7 is a front perspective view of an exemplary grinding machine cell manufacture line utilizing a portable control unit and a plurality of dedicated docking stations.

FIG. 7 is a front perspective view of an exemplary grinding machine cell manufacture line 400 utilizing a portable control unit 410 and a plurality of dedicated docking stations 420a-d. As shown, the grinding machine cell manufacturing line 400 may include a plurality of grinding machines 430a-d. Each grinding machine may be configured to manufacture parts (e.g., grinding engine camshafts). The manufacturing process may require that each grinding machine and grinding wheel be dynamically balanced and rebalanced on a very close time schedule to assure consistent grinding results for critical ground parts such as camshafts. Each grinding machine 430a-d may include a dedicated docking station 420a-d configured to interface with the portable control unit 410. For example, as illustrated, the portable control unit 410 may be configured to interface with a docking station 420a associated with the first grinding machine 430a, thereby allowing a user to operate and rebalance the first grinding machine 430a by inputting a command to rebalance the grinding wheel. If the user then wishes to operate and rebalance the second grinding machine 430b, the user may quickly decouple the portable control unit 410 from the first docking station 420a and quickly recouple it to the second docking station 420b. In this manner, both the first grinding machine 430a and the second grinding machine 430b as well as many more grinding machines 430a-d with docking stations 420a-d may be operated, controlled, balanced, and rebalanced by single portable control unit 410.

The invention claimed is:

1. A portable control unit for controlling a cylindrical grinding machine, the portable control unit comprising:
   an attachment mechanism configured to demountably couple the portable control unit to a docking station on the cylindrical grinding machine;
   a communications interface configured to electrically and communicatively couple with the docking station, wherein the docking station is communicatively coupled to the cylindrical grinding machine;
   an input interface configured to receive a command, wherein the communications interface transmits the received command to the cylindrical grinding machine; and
   an output interface configured to display status data received via the communications interface,
   wherein the communications interface comprises a plurality of electrical contacts, and wherein each electrical contact comprises a flat contact face.

2. The portable control unit of claim 1, wherein the communications interface is further configured to receive power from the docking station.

3. The portable control unit of claim 2, wherein the communications interface, the input interface, and the output interface are configured to be substantially instantaneously operable when power is received.

4. The portable control unit of claim 1, wherein the attachment mechanism comprises a recess, and wherein the recess receives a lug on the docking station.

5. The portable control unit of claim 1, wherein the received command indicates that a grinding wheel should be balanced.

6. The portable control unit of claim 1, further comprising a support element protruding beyond the communications interface, wherein the communications interface is separated from a surface when the support element rests on the surface.

7. A control system for controlling a cylindrical grinding machine, the control system comprising:
   a portable control unit comprising:
      a controller attachment mechanism; and
      a controller communications interface; and
   a docking station mechanically and communicatively coupled to the cylindrical grinding machine, the docking station comprising:
      a docking station attachment mechanism configured to demountably couple to the controller attachment mechanism;
      a docking station communications interface configured to communicatively couple with the controller communications interface;
      a power interface configured to receive power from the cylindrical grinding machine; and
      a component interface communicatively coupled to the cylindrical grinding machine,
   wherein the docking station communications interface receives commands from and transmits status data to the controller communications interface.

8. The control system of claim 7, wherein the docking station further comprises a hinged cover configured to selectively cover the docking station communications interface.

9. The control system of claim 8, wherein the hinged cover comprises a magnet configured to maintain the hinged cover in a closed position.

10. The control system of claim 7, wherein the docking station communications interface is configured to transmit power to the controller communications interface.

11. The control system of claim 10, wherein the docking station further comprises a trigger, and wherein the docking station communications interface is configured to transmit power to the controller communications interface when the trigger is activated.

12. The control system of claim 7, wherein the portable control unit is configured to be substantially instantaneously operable when power is received by the portable control unit.

13. The control system of claim 7, wherein the docking station further comprises mechanical guides configured to align the portable control unit with the docking station.

14. The control system of claim 7, wherein the controller attachment mechanism comprises a recess, and wherein the docking station attachment mechanism comprises a lug configured to removeably couple with the recess.

15. The control system of claim 7, wherein the portable control unit further comprises:
   an input interface to receive the commands; and
   an output interface configured to display the status data.

16. The control system of claim 7, wherein at least one of the commands indicates that a grinding wheel should be balanced.

17. The control system of claim 7, where the controller communications interface comprises a plurality of electrical contacts, and wherein each electrical contact comprises a flat contact face.

18. A portable control unit for controlling a cylindrical grinding machine, the portable control unit comprising:
   an attachment mechanism configured to demountably couple the portable control unit to a docking station on the cylindrical grinding machine;
   a communications interface configured to electrically and communicatively couple with the docking station, wherein the docking station is communicatively coupled to the cylindrical grinding machine;
   an input interface configured to receive a command, wherein the communications interface transmits the received command to the cylindrical grinding machine;
   an output interface configured to display status data received via the control interface; and
   a support element protruding beyond the communications interface, wherein the communications interface is separated from a surface when the support element rests on the surface.

* * * * *